United States Patent
Keyes et al.

[11] 3,860,486
[45] Jan. 14, 1975

[54] INSOLUBILIZING ENZYMES WITH POLYSTYRENE DERIVATIVES

[75] Inventors: Melvin H. Keyes, Toledo; Frank E. Semersky, Fostoria, both of Ohio

[73] Assignee: Owens-Illinois, Inc., Toledo, Ohio

[22] Filed: May 24, 1973

[21] Appl. No.: 363,676

[52] U.S. Cl.............. 195/68, 195/63, 195/DIG. 11
[51] Int. Cl............................................. C07g 7/02
[58] Field of Search.............. 195/63, 68, DIG. 11; 260/112

[56] References Cited
UNITED STATES PATENTS
3,775,378  11/1973  Dahlmans et al................ 260/112.5

OTHER PUBLICATIONS
Stark, G. R., Biochemical Aspects of Reactions on Solid Supports, Academic Press, N.Y., 1971 (pp. 6-13 & 204-207), QD521.B5.

Primary Examiner—David M. Naff
Attorney, Agent, or Firm—Henry P. Stevens; Edward J. Holler

[57]  ABSTRACT

Enzymes such as ribonuclease, chymotrypsin, peroxidase and the like can be rendered water insoluble by reaction with a polystyrene compound of the formula A

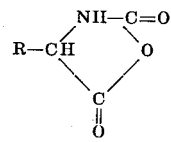

in which R is poly(chloromethylstyryl) wherein a minor portion of the chloro groups is substituted by 2,5-dioxo-4-oxazolidine.

4 Claims, No Drawings

INSOLUBILIZING ENZYMES WITH POLYSTYRENE DERIVATIVES

BACKGROUND OF THE INVENTION

An enzyme is defined as a biological catalyst capable of initiating, promoting and governing a chemical reaction without being consumed in the process or becoming part of the product formed. All enzymes are proteins and as such are sensitive to high temperatures, changes in pH, microbial attack and hydrolysis. Enzymes are synthesized by plants, animals and microorganisms and can be isolated from such diverse sources as figs, pineapples, and hog pancreas as well as microbial cells such as Aspergillus oryzae.

Enzymes have been used since prebiblical times to make bread, cheese and wine. More progress has been made in enzyme production and application in the past 100 years than in the previous 5,000 years. About $30 million worth of enzymes were marketed in the United States alone in 1964 and this figure is steadily increasing since enzymes can be used to produce not only food and beverages but pharmaceuticals, adhesives, paper and textiles.

Only a small percentage of animal and plant tissue is composed of enzymes which makes extraction procedures very costly. Furthermore, most enzymes are water soluble so that when used as catalysts they are difficult to remove from the finished product and cannot be reused. As a result, much effort has been expended in recent years to immobilize enzymes so that they can be used in continuous flow reactions or readily separated from the finished product in batch reactions and reused.

There are three principal methods for binding enzymes to matrixes such as cross-linked dextran gels, acrylic polymers, polyamino acids, cellulose or glass. These include covalent chemical binding, adsorption and entrapment of the enzyme within a gel lattice. A less common method involves converting the enzyme itself into an insoluble matrix by using bifunctional compounds to cross-link the enzyme into a large aggregate.

SUMMARY OF THE INVENTION

This invention is predicated upon the discovery that water soluble enzymes can be rendered water insoluble by reaction with a modified polychloromethylstyrene in which less than 50 percent of the chloro groups are substituted by the 2,5-dioxo-4-oxazolidine group. The reaction is carried out in an aqueous medium at about 0°C. and in the presence of an alkali metal bicarbonate (preferably sodium bicarbonate). When the reaction is complete, the solid, water insoluble, enzyme product formed is separated by filtration, washed repeatedly with water and assayed for activity.

DESCRIPTION OF THE PREFERRED EMBODIMENTS

EXAMPLE 1

Two and one-half milliliters of dimethylformamide and 2.5 milliliters of 0.2 molar aqueous sodium bicarbonate were mixed containing 3.4 milligrams of ribonuclease per milliliter, cooled to 0°C. and 200 milligrams of the compound shown in formula A was added with stirring. The temperature and stirring were maintained for 72 hours after which time the water insoluble ribonuclease formed was separated by filtration and washed repeatedly with distilled water. The sample thus prepared was assayed initially and periodically by measuring the rate of change of cytidine-2',3'-cyclic phosphate to cytidine monophosphate by the method of Hammes and Walz as described in Biochim. Biophys. Acta, 198, 604 (1970). The initial activity was equivalent to 0.2 milligram of soluble ribonuclease per gram of modified polystyrene which diminished slightly after 10 days of storage at 0°C.

EXAMPLE 2

Five milligrams of chymotrypsin is dissolved in 10 milliliters of water and 4 milliliters of said solution is mixed with 25 milligrams of the compound shown in formula A. The resulting mixture is saturated with $NaHCO_3$ and stirred for 3 hours at 0°C. The activity of the water insoluble chymotrypsin thus produced is measured by the method of Hummel as described in Can. J. Biochem. Physiol., 37, 1,393 (1959) using benzoyl tyrosine ethyl ester as a substrate.

EXAMPLE 3

Thirty milligrams of the compound shown in formula A is mixed with 20 milliliters of aqueous $5 \times 10^{-5}$ molar horseradish peroxidase solution saturated with $NaHCO_3$ at 0°C. and stirred for 20 hours. The water insoluble peroxidase formed is separated by filtration and the activity measured by catalysis of the conversion of guaiacol and $H_2O_2$ to tetraguaiacol and water.

If desired, other enzymes such as papain, trypsin, xanthine oxidase, glutamicpyruvic transaminase and the like can be rendered water insoluble by reaction with the compound of formula A as described in the foregoing examples. All such modifications are considered to be within the scope of the present invention unless obviously contrary to the appended claims.

The compounds of formula A can be prepared by various methods and more specifically as described in the patent application of Don N. Gray, U.S. Ser. No. 363,677 filed concurrently herewith the subject matter of which is hereby incorporated by reference. One such method is shown in the following series of reactions:

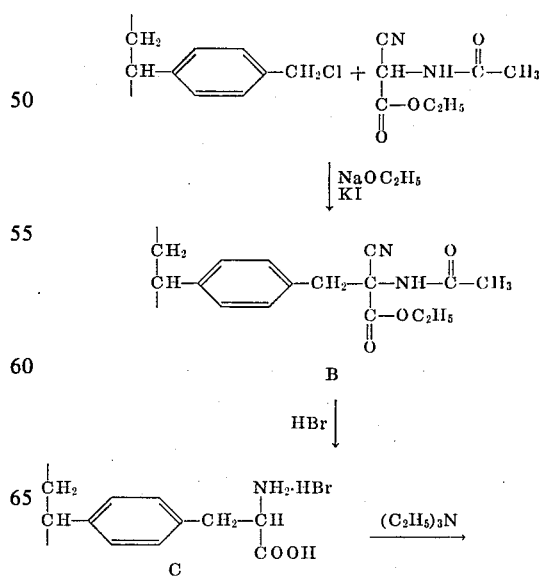

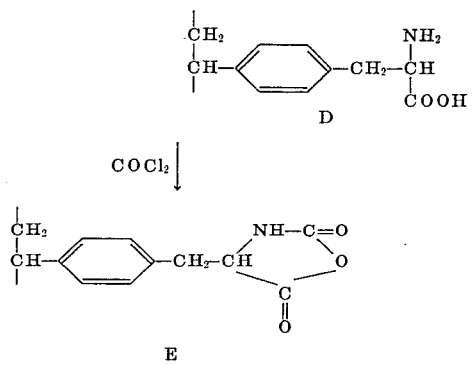

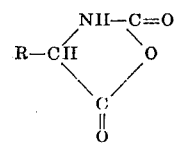

In carrying out these reactions, 4 moles of ethylacetamidocyanoacetate and 1 mole of poly(chloromethylstyrene) in acetone is refluxed in the presence of sodium iodide and sodium ethylate for 24 hours to form compound B which is separated by filtration and purified by extraction with alcohol and water. This purified product is then slurried with hydrobromic acid at the reflux temperature for about 24 hours to form the acid salt C which is separated and neutralized with triethylamine at room temperature. The polystyryl alanine D thus formed, is then separated, dissolved in dioxane and gradually heated to 40°C. while phosgene gas is passed through the mixture to cyclize the polystyryl alanine and form the compound of formula E which is removed by filtration and dried.

What we claim is:

1. A method of rendering enzymes water insoluble which comprises reacting an enzyme in an aqueous alkaline medium at a temperature of about 0°C. with a polystyrene compound of the formula is which R is poly(chloromethylstyryl) wherein a minor portion of the chloro groups is substituted by 2,5-dioxo-4-oxazolidine and recovering the resultant product.

2. A method as in claim 1 in which the enzyme is ribonuclease.

3. A method as in claim 1 in which the enzyme is chymotrypsin.

4. A method as in claim 1 in which the enzyme is peroxidase.

* * * * *